United States Patent [19]

Hoshiba et al.

[11] Patent Number: 5,595,589
[45] Date of Patent: Jan. 21, 1997

[54] BAKED COLOR PENCIL LEAD AND METHOD OF MANUFACTURING THE SAME

[75] Inventors: Masaaki Hoshiba, Fujioka; Kazutaka Aoki, Iwata, both of Japan

[73] Assignee: Mitsubishi Pencil Kabushiki Kaisha, Tokyo, Japan

[21] Appl. No.: 617,042

[22] Filed: Mar. 18, 1996

[30] Foreign Application Priority Data

Mar. 27, 1995 [JP] Japan .................................. 7-067319

[51] Int. Cl.$^6$ .................................................. C09D 13/00
[52] U.S. Cl. ........................................ 106/19 B; 106/19 R
[58] Field of Search .............................. 106/19 R, 19 B; 501/97

[56] References Cited

U.S. PATENT DOCUMENTS

| | | | |
|---|---|---|---|
| 4,017,451 | 4/1977 | Ishida et al. | 106/19 B |
| 4,853,167 | 8/1989 | Bard et al. | 106/19 B |
| 5,318,622 | 6/1994 | Kitazawa et al. | 106/19 B |
| 5,346,540 | 9/1994 | Schlennert | 106/19 B |

FOREIGN PATENT DOCUMENTS

| | | |
|---|---|---|
| 51-41376 | 11/1976 | Japan . |
| 59-117570 | 7/1984 | Japan . |
| 59-117569 | 7/1984 | Japan . |
| 61-275370 | 12/1986 | Japan . |
| 64-4555 | 1/1989 | Japan . |
| 5-302054 | 11/1993 | Japan . |

*Primary Examiner*—Helene Klemanski
*Attorney, Agent, or Firm*—Darby & Darby, P.C.

[57] ABSTRACT

A baked color pencil lead which can draw lines showing a vivid color and having excellent light fastness while holding excellent physical strength, and which is manufactured by a method comprising the steps of:

kneading a blend composition comprising at least a filler and an organic forming binder, molding the composition by extrusion, and baking the molded composition in a non-oxidizing atmosphere, to thereby form a first baked lead containing a binder of a carbon produced by carbonizing the above organic forming binder, heating the first baked lead in an oxidizing atmosphere to remove the binder of the carbon by oxidation, to thereby form a second baked lead, impregnating the pores of the second baked lead with a perhydropolysilazane-containing solution and then subjecting it to a heat treatment in an inert atmosphere such as a nitrogen atmosphere or in an ammonia atmosphere, to thereby form a third baked lead containing silicon nitride produced by the heat treatment, and impregnating the pores of the third baked lead with an organic pigment solution and solidifying the organic pigment in the pores to allow at least the organic pigment to be contained in the baked lead as a colorant.

18 Claims, No Drawings

BAKED COLOR PENCIL LEAD AND METHOD OF MANUFACTURING THE SAME

BACKGROUND OF THE INVENTION (1) Field of the Invention

The present invention relates to a baked color pencil lead which can draw lines showing a vivid color and having excellent light fastness and weather resistance and which holds excellent physical strength, that is, flexural strength, tensile strength and impact strength, and a method of manufacturing the same.

(2) Description of the Related Art

Conventional baked color pencil leads have been manufactured by adding a filler such as boron nitride and according to necessity, a heat-resistant pigment and a reaction accelerator to at least one kind of clay as a binder, kneading the resulting blend composition, molding this kneaded matter by extrusion and then subjecting it to a heat treatment to prepare a porous baked lead, and filling the pores of this lead with an ink comprising a dye. In this case, required to leads are important characteristics such as strong mechanical strength, a good coloring property, a high density of drawn lines, and excellent light fastness and weather resistance.

However, conventional baked color pencil leads are not sufficient in high mechanical strength, a density and a coloring property, light fastness and weather resistance. Accordingly, in order to enhance the density and the coloring property, the amount of an ink to be filled into the leads has to be increased by raising the porosity while maintaining the high mechanical strengths.

Proposed as a method of increasing the porosity of a baked color pencil lead are, for example, a method in which a resin which is a forming binder is added to a filler and a binder, and this resin is sublimated or burned in an oxidizing atmosphere during baking to form pores (refer to Japanese Patent Publication Nos. Sho 64-4555 and Sho 51-41376), a method in which a granular carbon material is used as a pore-forming material, and this is burned in an oxidizing atmosphere to form pores (refer to Japanese Patent Application Laid-Open No. Sho 61-275370), and a method in which a fibrous material is used as a pore-forming material, and this is burned in an oxidizing atmosphere, or sublimated or melted by heating to high temperatures to form pores (refer to Japanese Patent Application Laid-Open No. Hei 5-302054).

However, a conventional baked lead using clay as a binder has a weak bonding force between a filler such as boron nitride and the binder, and the clay itself has low strength. Accordingly, the existing situation is that the resulting baked color pencil lead has not attained practical strength. Further, the clay contains impurities, so that the baked leads are usually colored and have the problem that an adverse effect is exerted on the coloring property of drawn lines. In particular, it causes a somber color of light-colored drawn lines.

Accordingly, proposed are a method using aluminum nitride as a white porous material having high strength (refer to Japanese Patent Application Laid-Open No. Sho 59-117570) and a method using silicon nitride (refer to Japanese Patent Application Laid-Open No. Sho 59-117569).

However, in the aforementioned former method using aluminum or an aluminum compound, it is difficult to obtain fine powder having a particle diameter of 2 μm or less suitable for the binder, and the larger particle diameter provides the problem that it damages a writing feeling.

The silicon nitride used in the latter method described above has high strength and is very useful as the binder. Known as a method of manufacturing porous leads using this silicon nitride as the binder are:

(1) a method in which silicon nitride powder is kneaded with a filler and the like, and the mixture is molded, followed by baking under pressurizing in a nitrogen atmosphere, and (2) a method in which silicon powder is kneaded with a filler and the like, and the mixture is molded, followed by baking in a nitrogen atmosphere or an ammonia gas atmosphere to nitride.

However, the method (1) described above has the problem that it is difficult to obtain a color pencil lead having high strength even by applying pressure because of difficulty in baking silicon nitride.

Further, in the method (2) described above, the silicon powder having a particle diameter of 1 μm or less is susceptible to a spontaneous oxidation to become silicon oxide powder, and much attention has to be paid for preventing the oxidation. That is because when carbon coexists, silicon oxide is nitrided by baking at 1200° C. to 1300° C. in a nitrogen atmosphere and causes growth in the vapor phase to form silicon nitride whiskers. Further, the larger particle diameter of the silicon powder causes the problem that the writing feeling is impaired.

Furthermore, since there are available no pigments which have a vivid hue as colorants and a high heat resistant temperature and which are harmless to a human body and usable to baked color pencil leads, dyes which can be impregnated after baking are used as colorants in conventional baked color pencils. However, the dyes have the problem that the drawn lines are inferior in light fastness and weather resistance. Leads having large pores make it possible to cause the pores to be impregnated with a pigment-dispersed ink but have the problem that they can not be used for baked color pencil leads because of a reduction in the strength.

SUMMARY OF THE INVENTION

The objects of the present invention are to solve the problems described above, particularly the problem caused when silicon nitride is used for the conventional porous leads described above, and to provide a baked color pencil lead which has the characteristics such as a markedly excellent mechanical property and a vivid color and capable of drawing lines having excellent light fastness and weather resistance, and a method of manufacturing the same.

Intensive researches made by the present inventors in order to solve the problems described above have resulted in finding that they can be solved by impregnating the pores of a specific baked color pencil lead comprising at least a filler with a perhydropolysilazane-containing solution, producing silicon nitride as a binder by a heat treatment in an inert atmosphere such as a nitrogen atmosphere or in an ammonia gas atmosphere to form a baked porous lead having high mechanical strength, impregnating the pores of the lead with an organic pigment solution, and solidifying the pigment in the pores by means of water deposition or the like, and thus the present invention has been completed.

The baked color pencil lead of the present invention is manufactured by a method comprising the steps of:

kneading a blend composition comprising at least a filler and an organic forming binder, molding the composition by extrusion, and baking the molded composition in a non-oxidizing atmosphere, thereby to form a first baked lead containing a binder of carbon produced by carbonizing the above organic forming binder, heating the first baked lead in an oxidizing atmosphere to remove the binder of the carbon by oxidation, thereby to form a second baked lead comprising at least the filler, impregnating the pores of the second baked lead with a perhydropolysilazane-containing solution and then subjecting it to a heat treatment in an inert atmosphere such as a nitrogen atmosphere or in an ammonia gas atmosphere, thereby to form a third baked lead containing silicon nitride, and impregnating the pores of the third baked lead with an organic pigment solution and solidifying the organic pigment in the pores to allow the pigment to be contained in the baked lead as a colorant.

A method for manufacturing the baked color pencil lead of the present invention comprises the steps of:

kneading a blend composition comprising at least a filler and an organic forming binder, molding the composition by extrusion, and baking the molded composition in a non-oxidizing atmosphere, thereby to form a first baked lead containing a binder of carbon, heating the first baked lead in an oxidizing atmosphere to remove the binder of the carbon by oxidation, thereby to form a second baked lead, impregnating the pores of the second baked lead with a perhydropolysilazane-containing solution and then subjecting it to a heat treatment in an inert atmosphere such as a nitrogen atmosphere or in an ammonia gas atmosphere, thereby to form a third baked lead containing silicon nitride, and impregnating the pores of the third baked lead with an organic pigment solution prepared by dissolving the organic pigment in at least one selected from an organic solvent, an acid solution and an alkali solution, and solidifying the organic pigment in the pores by at least one means selected from solvent evaporation, poor solvent replacement method for the pigment including water deposition, and neutralization to allow the pigment to be contained in the baked lead as a colorant.

The present invention provides a baked color pencil lead which has excellent mechanical strength and is hard to be broken practically even if the porosity is large since a perhydropolysilazane-containing solution is used to produce silicon nitride as a binder, and which is excellent in light fastness and weather resistance and has a vivid color since a pigment is used as a colorant.

The method of the present invention provides a method of manufacturing a baked color pencil lead in which silicon nitride having a high purity can be produced as a binder at a very high yield and a lower temperature than those of conventional baking methods by using the perhydropolysilazane-containing solution, which has excellent mechanical strength and is hard to be broken practically and which is excellent in light fastness and weather resistance and has a vivid color since a pigment is used as a colorant.

DETAILED DESCRIPTION OF THE PREFERRED EMBODIMENTS

In the present invention, first, a blend composition containing at least a filler and an organic forming binder is used as a raw material for the first baked lead.

The filler is not specifically restricted as far as it is used for conventional baked type color pencil leads, but acid-resistant and alkali-resistant fillers which are not damaged by an organic pigment solution have to be used. There may be used, for example, white fillers such as titanium oxide, mica, talc, boron nitride, silica, alumina, and calcium carbonate, and according to the hues, colored fillers such as molybdenum disulfide and tungsten disulfide. As a mater of course, a mixture of several kinds thereof may be used. Further, heat-resistant pigments may be blended in case of necessity.

There may be used as the organic forming binder, for example, thermoplastic resins such as a vinyl chloride resin, a chlorinated vinyl chloride resin, and polyvinyl alcohol, thermosetting resins such as a furan resin, a phenol resin, and an epoxy resin, natural polymers such as lignin, cellulose, and tragacanth gum, and pitches such as petroleum asphalt, coal tar pitch, naphtha cracking pitch, and dry distillation pitches of synthetic resins. As a matter of course, a mixture of several kinds thereof may be used.

Further, for the purpose of improving the characteristics in kneading under applying a high shearing force and the characteristics in extrusion molding, there may be blended according to necessity, at least one of plasticizers or solvents for the organic forming binder such as water, dioctyl phthalate (DOP), dibutyl phthalate (DBP), tricresyl phosphate (TCP), octyl adipate (DOA), propylene carbonate, alcohols, ketones, and esters.

The blend composition is sufficiently kneaded with a Henschel mixer, a pressure kneader and a twin roll, and then molded by extrusion in the form of a fine line, followed by baking in a non-oxidizing atmosphere such as a nitrogen atmosphere and an inert gas atmosphere of argon gas and the like. Thus a first baked lead containing carbon produced by carbonizing the organic forming binder as a binder is obtained.

In the resulting first baked lead, the pores and the binder of the carbon produced by baking are fine and uniformly dispersed, with the volume thereof being large, and the filler is densely oriented.

In order to enhance the strength of the second baked lead and improve the handling properties thereof, an inorganic binder such as clay, bentonite and kaolin may be blended, if necessary, in the blend composition for obtaining the first baked lead. The blend amount thereof may be controlled less than 25 weight % to exert easily the strength imparted by silicon nitride which will be described later. However, when the organic pigment solution is alkaline, Si—O bonds are broken to reduce the strength, and therefore it should be taken into consideration in advance.

Further, if necessary, the first baked lead obtained above may be impregnated with the perhydropolysilazane-containing solution and subjected to a heat treatment in an inert atmosphere such as a nitrogen atmosphere or in an ammonia gas atmosphere to produce silicon nitride.

The term "in an inert atmosphere such as a nitrogen atmosphere" specified in the present invention means "in a nitrogen gas atmosphere or in an inert gas atmosphere such as an argon gas atmosphere".

The first baked lead obtained above is heated in an oxidizing atmosphere to remove the binder of the carbon by oxidizing it, whereby the second baked lead comprising a porous lead having many pores is obtained.

Here, the pores of the second baked lead are composed of both the pores obtained by baking the kneaded composition comprising the filler and the organic forming binder in a non-oxidizing atmosphere and the pores obtained by removing the above binder of the carbon. The porosity of the second baked lead is controlled by adjusting mainly a blend ratio of the organic forming binder, and other pore-forming materials such as a granular carbon material may be suitably added. The ratio of the pores formed by removing the binder of the carbon to the whole pores is completely optional.

As described above, the resulting second baked lead is a porous lead having many pores and a large porosity. The above pores are fine and uniformly dispersed, in which the filler is densely oriented. This makes the second baked lead obtained from the first baked lead useful for obtaining the intended baked color pencil lead having high strength.

In the present invention, the third baked lead is obtained by impregnating the second baked lead comprising the porous lead obtained above with the perhydropolysilazane-containing solution and then subjecting the second baked lead to a heat treatment at 400° C. or higher, preferably 600° C. or higher in an inert atmosphere such as a nitrogen atmosphere or in an ammonia gas atmosphere to produce silicon nitride as a binder in the second baked lead.

The larger the amount of perhydropolysilazane filled into the second baked lead is, that is, the larger the porosity of the second baked lead is, the more the amount of silicon nitride produced as the binder increases and the higher the mechanical strength of the resulting third baked lead becomes.

However, the porosity of the second baked lead exceeding 80% makes it difficult to maintain the shape of the lead, so that it is difficult to carry out an impregnating step of the perhydropolysilazane-containing solution. Meanwhile, the porosity of less than 30% reduces the filling amount of the perhydropolysilazane-containing solution and makes it impossible to expect a marked improvement in the mechanical strength. Further, in that case the amount of an organic pigment solution filled into the resulting third baked lead is reduced as well, so that the practical coloring property and density can not be obtained.

Accordingly, the porosity of the second baked lead falls in a range of 30 to 80%, and in order to obtain the better quality of the third baked lead, the porosity is preferably 35 to 75%.

In the present invention, perhydropolysilazane used for obtaining the third baked lead is a ceramics precursor polymer, wherein the main chain has a [—Si—N—] structure, and only hydrogen atoms are bonded to the side chains; the polymer is represented by a general formula $[SiH_aN_b]_n$, in which a is an integer of from 1 to 3, and b is an integer of 0 or 1, and has mainly a structure having the skeleton of $[SiH_2NH—]_n$. Only the hydrogen atoms are removed by a thermal decomposition in an inert atmosphere such as a nitrogen atmosphere or in an ammonia gas atmosphere, which results in enabling to produce silicon nitride as the binder at a very high yield.

Most of the resulting silicon nitride is trisilicon tetranitride ($Si_3N_4$), but a small amount thereof is present in another form of ($Si_xN_y$) depending on the raw materials to be used and the heat treatment conditions.

Further, since organic components such as a methyl group are not contained, colorless, transparent and high purity silicon nitride containing no carbon is obtained. In addition, the silicon nitride obtained in the present invention is characterized in that it is produced at a lower temperature than those in other baking methods, that is, at a low temperature of about 600° C. in an inert atmosphere such as a nitrogen atmosphere or in an ammonia gas atmosphere, while the treatment is carried out at high temperatures of 1200° C. to 1400° C. in a baking method in which silicon nitride is produced from silicon powder.

The perhydropolysilazane-containing solution is prepared by dissolving the perhydropolysilazane described above in an organic solvent. The organic solvent to be used is not specifically restricted as long as the second baked lead can be impregnated with the above perhydropolysilazane-containing solution, and any solvent may be used. The organic solvent to be used includes organic solvents such as benzene, toluene, xylene, tetrahydrofuran (THF), methylene chloride, carbon tetrachloride, and aromatic hydrocarbons.

The second baked lead can be impregnated with the perhydropolysilazane-containing solution by immersing the second baked lead in the perhydropolysilazane-containing solution and impregnating the lead with the solution under the conditions of heating, reducing pressure and applying pressure according to necessity.

The perhydropolysilazane-containing solution is uniformly dispersed in the fine pores of the second baked lead to be impregnated the pores, because in the second baked lead, the porosity is large, and the pores are fine and uniformly dispersed, and further the filler is densely oriented. Accordingly, the second baked lead is useful for obtaining a baked color pencil lead having high strength.

In order to obtain the third baked lead having high strength, the impregnation step of the perhydropolysilazane-containing solution and the baking step may be repeated according to necessity.

The third baked lead is produced so as to disperse finely and uniformly silicon nitride as the binder and is densely oriented with the filler. Accordingly, even a small amount of the silicon nitride formed can readily provide the strength of the lead, and the lead is abraded uniformly in writing.

In the present invention, the baked color pencil lead is obtained by filling the organic pigment solution into the pores of the third baked lead obtained above and solidifying the above organic pigment in the pores.

The concrete examples of the organic pigment used in the present invention include condensed polycyclic pigments such as monoazo pigments, copper phthalocyanine pigments, quinacridone pigments, anthraquinone pigments, indigo pigments, perylene pigments, perynone pigments and quinophthalone pigments.

The organic pigment solution is prepared by dissolving an organic pigment in an organic solvent, an acid solution or an alkali solution, or in combination with them, preferably by dissolving it in sulfuric acid or in the organic solvent in the presence of alkali.

The solidification of the organic pigment from the organic pigment solution soaked into the pores includes a poor solvent replacement method in which the pores are impregnated with a so-called poor solvent which is more difficult to dissolve the organic pigment than the organic solvent dissolving the pigment to precipitate the organic pigment, and this method includes water deposition in which the organic pigment is deposited by impregnating the pores with water. Further, there may be employed as well a neutralizing method in which the organic pigment is solidifying by neutralization, that is, the pores are impregnated with an alkali solution when the organic pigment is dissolved in an acid solution, or the pores are impregnated with an acid solution when the organic pigment is dissolved in an alkaline solution, and a solvent evaporation method in which the organic solvent is evaporated by heating. At least one selected from these solidifying methods may be employed depending on the condition of the solution.

For the purpose of expediting the impregnation, the impregnation may be carried out under heating, reducing pressure or applying pressure and in the presence of surfactants and other additives.

It is also possible to repeat the impregnation of the residual pores of the baked color pencil lead which has finished the solidification of the organic pigment with the organic pigment solution and solidification of the pigment to make the color tone deeper.

Further, for the purpose of complementing and mixing color, it may be possible to impregnate the pores with a dye-containing ink having a color which is the same as and/or different from that of the pigment with which the residual pores have been impregnated, and it is possible as well to make use of the low light fastness of the dye to manufacture a baked color pencil lead which is discolored by light.

Furthermore, it is also possible to impregnate the residual pores with oil and the like to enhance the lubricity in writing.

In order to make the lead erasable as easily as a baked carbon lead with an eraser, the oil has to be selected from oil & fats and/or waxes which are liquids at ordinary temperatures. The concrete examples thereof include silicone oils, mineral oils, liquid paraffins, and α-olefin oligomers.

In the baked color pencil lead of the present invention and the method for manufacturing the same, (1) the second baked lead formed by heating the first baked lead in an oxidizing atmosphere to remove the binder of carbon by oxidation is a porous lead having many pores, and silicon nitride can be produced as the binder in the second baked lead by impregnating the second baked lead having many pores with a perhydropolysilazane-containing solution and subjecting it to a heat treatment in an inert atmosphere such as a nitrogen atmosphere or in an ammonia gas atmosphere, which results in enhancing the mechanical strength of the above baked lead;

(2) since colorless, transparent silicon nitride is obtained by using the perhydropolysilazane-containing solution, the third baked lead becomes white by selecting a white filler and exerts no adverse effects on the hue of lines drawn with the baked color pencil lead; further, since the resulting silicon nitride is excellent in solvent resistance, acid resistance and an alkali resistance, it becomes possible to impregnate the pores of the above baked color pencil lead with a pigment solution prepared by dissolving the pigment in an organic solvent, an acid solution or alkali solution, and the baked color pencil lead having a high chroma and a vivid color can be obtained by using at least the pigment solidified in the pores by means of water deposition, neutralization or solvent evaporation as a colorant;

(3) in the second baked lead formed by heating the first baked lead in an oxiding atmosphere to remove the binder of the carbon by oxidation, the porosity is large, and the pores are fine and uniformly dispersed, and the filler is densely oriented as well, so that the third baked lead can be highly strengthened while holding the pores to be filled with a pigment solution prepared by dissolving the pigment in an organic solvent, an acid solution or an alkali solution, which is necessary to obtain the high density of drawn lines, by producing a small amount of silicon nitride having high strength in the second baked lead;

(4) the fine and uniform dispersion of the silicon nitride existing in the third baked lead as the binder sharpens the pore distribution and allows the solidified pigment to be uniformly dispersed in the third baked lead; in addition, the uniform abrasion of the densely oriented filler at the time of writing equalizes the density of drawn lines and makes the writing feeling equal to or higher than that of conventional baked color pencil leads using clay for the binders;

(5) unlike leads obtained merely by impregnating conventional light-colored or white porous leads with a dye-containing ink, the baked color pencil lead of the present invention contains at least the pigment as the colorant, so that the baked color pencil lead capable of drawing lines having excellent light fastness and weather resistance can be obtained.

EXAMPLES

The present invention will be more concretely explained with reference to examples, but the present invention will be by no means restricted by these examples.

Example 1

| | |
|---|---|
| Boron nitride | 50 weight parts |
| Vinyl chloride resin | 50 weight parts |
| Dioctyl phthalate (DOP) | 20 weight parts |
| Zinc stearate | 1 weight part |

The blend composition described above was mixed and dispersed with a Henschel mixer and kneaded with a pressure kneader or a twin roll. Then, the composition was molded in the form of thin lines by extrusion and subjected to a heat treatment at 180° C. for 10 hours in the air in order to remove the residual plasticizer, followed by elevating the temperature to 300° C. at 10° C./hr and from 300° C. to 1000° C. at 30° C./hr and then baking at 1000° C. for one hour. Thus the first baked lead wad obtained.

This first baked lead was heated and baked at about 700° C. in an oxidizing atmosphere to remove the residual carbonized resin, whereby the white second baked lead (porosity: 47.8%) was obtained.

This second baked lead was impregnated with a solution prepared by dissolving perhydropolysilazane in xylene at room temperatures for one day, and then was heated to 600° C. at 60° C./hr in a nitrogen atmosphere, followed by baking at 600° C. for one hour. The baked lead was thus obtained. This baked lead was further impregnated with the perhydropolysilazane-containing solution, and the baking step was further repeated once again, whereby the white third baked lead having a diameter of 0.57 mm was obtained.

Next, the third baked lead was immersed for 24 hours in a pigment solution prepared by dissolving C. I. Pigment Blue 5:3 (copper phthalocyanine pigment) of 14 weight % in 96 weight % sulfuric acid of 86 weight % to impregnate the pores with the pigment solution. Then, the lead was immersed in water for 12 hours to solidify the pigment, followed by neutralizing, washing and drying. Thus the baked blue pencil lead having a diameter of 0.57 mm was obtained.

Example 2

The white third baked lead obtained in the same manner as that in Example 1 described above was immersed for 12 hours in a pigment solution prepared by dissolving C. I. Pigment Red 22 (monoazo pigment) of 8 weight % in dimethyl sulfoxide of 80 weight % and a 25% sodium hydroxide aqueous solution of 12 weight % to impregnate the pores with the pigment solution. Then, the lead was immersed in a 1% hydrochloric acid aqueous solution for 12 hours to solidify the pigment, followed by washing and drying. Thus the baked red pencil lead having a diameter of 0.57 mm was obtained.

Comparative Example 1

The white third baked lead obtained in the same manner as that in Example 1 described above was impregnated with a ball point pen ink containing C. I. Solvent Blue 70 to obtain the baked blue pencil lead having a diameter of 0.57.

Comparative Example 2

| Boron nitride | 50 weight parts |
|---|---|
| Bentonite | 50 weight parts |
| Polyvinyl alcohol | 10 weight parts |
| Water | 100 weight parts |

The blend composition described above was mixed and dispersed with the Henschel mixer and kneaded with twin roll to control the water content. Then, the composition was molded in the form of thin lines by extrusion. After drying it at 105° C. for 15 hours or more, it was heated to 1100° C. in an argon gas to be baked for one hour, and then it was heated to 600° C. in an oxidizing atmosphere to be oxidized and baked at 600° C. for 5 hours. Thus the white baked lead having a diameter of 0.57 mm was obtained.

Next, the baked lead was impregnated with a ball point pen ink containing C. I. Solvent Red 8 to obtain the baked red pencil lead having a diameter of 0.57 mm.

Comparative Example 3

The white third baked lead obtained in the same manner as that in Example 1 described above was immersed for 12 hours in a pigment solution prepared by dissolving C. I. Pigment Red 22 (monoazo pigment) of 8 weight % in dimethyl sulfoxide of 80 weight % and a 25% sodium hydroxide aqueous solution of 12 weight % to impregnate the pores with the pigment solution. Then, the lead was immersed in a 1% hydrochloric acid aqueous solution for 12 hours to solidify the pigment, followed by washing and drying. Thus the baked red pencil lead having a diameter of 0.57 mm was obtained.

Comparative Example 4

| Fine silicon powder | 10 weight parts |
|---|---|
| Boron nitride | 50 weight parts |
| Polystyrene | 20 weight parts |
| Dioctyl phthalate | 20 weight parts |
| Methyl ethyl ketone | 100 weight parts |

The blend composition described above was mixed and dispersed with the Henschel mixer and kneaded with a three-roll under heating. After molding the composition by extrusion, it was dried to 180° C. in the air in 10 hours in order to remove the residual solvent and plasticizer therefrom, and after heating it to 1250° C. in a nitrogen atmosphere in 24 hours, it was maintained at 1250° C. for 24 hours. Further, the temperature was elevated to 1450° C. in 4 hours, and then the lead was baked at 1450° C. for 10 hours, whereby the white baked lead having a diameter of 0.57 mm was obtained.

Next, the above white third baked lead was immersed for 12 hours in a pigment solution prepared by dissolving C. I. Pigment Red 22 (monoazo pigment) of 8 weight % in dimethyl sulfoxide of 80 weight % and a 25% sodium hydroxide aqueous solution of 12 weight % to impregnate the pores with the pigment solution. Then, the lead was immersed in a 1% hydrochloric acid aqueous solution for 12 hours to solidify the pigment, followed by washing and drying. Thus the baked red pencil lead having a diameter of 0.57 mm was obtained.

The respective baked color pencil leads obtained in Examples 1 to 2 and Comparative Examples 1 to 4 were used to measure the flexural strength (Mpa) before and after coloring in accordance with JIS-S-6005-1989 and evaluate the light fastness in terms of a difference $\Delta L^*$ between the lightness indices. The results thereof are shown in the following Table 1.

The porosity was measured with a mercury porosimeter.

The light fastness $\Delta L^*$ was obtained by drawing lines on a wood free paper, irradiating the lines with a xenon lamp for 6 hours and then measuring a difference between the lightness indices $L^*$ of the lines before and after the irradiation. The smaller the difference $\Delta L^*$ between the lightness indices is, the better the light fastness is.

TABLE 1

| | Flexural strength (MPa) | | |
|---|---|---|---|
| | Before coloring | After coloring | Light fastness $\Delta L^*$ |
| Ex. 1 | 280.5 | 279.0 | 0.5 |
| Ex. 2 | 280.5 | 272.3 | 1.2 |
| Comp. ex. 1 | 280.5 | 280.3 | 10.3 |
| Comp. ex. 2 | 139.6 | 141.1 | 12.8 |
| Comp. ex. 3 | 139.6 | 30.3 | 1.6 |
| Comp. ex. 4 | 176.1 | 119.3 | 1.1 |

[Consideration of the results shown in Table 1]

From an overall point of view, it has been found that the baked color pencil leads of the present invention obtained in Examples 1 and 2 are excellent in the flexural strength as well as the light fastness as compared with those of the baked color pencil leads obtained in Comparative Examples 1 to 4. From an individual point of view, it has been found that the baked color pencil leads which are notably excellent in mechanical strength and practically less breakable and which have very excellent light fastness can be obtained in Examples 1 and 2.

On the contrary, it has been formed that while the perhydropolysilazane-containing solution was used in Comparative Example 1 as was the case with Example 1, the baked lead was impregnated with a ball point pen ink containing C. I. Solvent Blue 70 (dye) in place of C. I. Pigment Blue 5:3 (pigment), and therefore the light fastness of the lead is markedly inferior.

Comparative Example 2 provides the conventional baked color pencil lead comprising boron nitride as the filler, bentonite as the binder, and C. I. Solvent Red 8 (dye) as the colorant, and it has been found that the light fastness and the mechanical strength of the lead are notably inferior as compared with those of the baked color pencil leads obtained in Examples 1 and 2.

Comparative Example 3 provides the conventional baked color pencil lead using boron nitride as the filler and bentonite as the binder as is the case with Comparative Example 2, and C. I. Pigment Red 22 (monoazo pigment) used as the colorant in the present invention. In this case, however, since the organic pigment solution is alkaline, the Si—O bonds in bentonite are broken. As a result, it has been found that the strength after coloring is markedly inferior and that the practical strength has not been attained.

Comparative Example 4 provides the baked color pencil lead prepared by a baking method in which silicon nitride is produced from fine silicon powder. Since the fine silicon powder susceptible to oxidation is used, the handling thereof is complicated in manufacturing. In addition, the baking is carried out at temperatures of 1200° C. or higher, and the silicon powder has been partially oxidized on the way of the manufacturing, so that the Si—O bonds have been broken by the impregnation with the alkaline pigment solution. Accordingly, it has been found that the mechanical strength is inferior as compared with those of the baked color pencil leads prepared in Examples 1 and 2.

What is claimed is:

1. A baked color pencil lead manufactured by a method comprising the steps of:

kneading a blend composition comprising at least a filler and an organic forming binder, molding the composition by extrusion, and baking the molded composition in a non-oxidizing atmosphere, thereby to form a first baked lead containing a binder of a carbon produced by carbonizing said organic forming binder, heating the first baked lead in an oxidizing atmosphere to remove the binder of the carbon by oxidation, thereby to form a second baked lead comprising at least the filler, impregnating the pores of the second baked lead with a perhydropolysilazane-containing solution and then subjecting it to a heat treatment in an inert atmosphere or in an ammonia gas atmosphere, thereby to form a third baked lead containing silicon nitride produced by the heat treatment, and impregnating the pores of the third baked lead with an organic pigment solution and solidifying the organic pigment in the pores to allow at least the pigment to be contained in the baked lead as a colorant.

2. A baked color pencil lead as described in claim 1, wherein the filler is at least one selected from the group consisting of titanium oxide, mica, talc, boron nitride, silica, alumina, calcium carbonate, molybdenum disulfide, and tungsten disulfide.

3. A baked color pencil lead as described in claim 1, wherein the organic forming binder is at least one selected from the group consisting of a vinyl chloride resin, a chlorinated vinyl chloride resin, polyvinyl alcohol, a furan resin, a phenol resin, an epoxy resin, lignin, cellulose, tragacanth gum, petroleum asphalt, coal tar pitch, naphtha cracking pitch, and dry distillation pitches of synthetic resins.

4. A baked color pencil lead as described in claim 1, wherein at least one selected from the group consisting of water, dioctyl phthalate, dibutyl phthalate, tricresyl phosphate, dioctyl adipate, propylene carbonate, alcohols, ketones, and esters is blended as a plasticizer or a solvent for the organic forming binder with the blend composition for obtaining the first baked lead.

5. A baked color pencil lead as described in claim 1, wherein bentonite or kaolin is blended as a binder with the blend composition for obtaining the first baked lead.

6. A baked color pencil lead as described in claim 1, wherein the second baked lead has a porosity of 30 to 80 %.

7. A baked color pencil lead as described in claim 1, wherein the inert atmosphere in which the third baked lead is formed is a nitrogen atmosphere.

8. A baked color pencil lead as described in claim 1, wherein the colorant is at least one organic pigment selected from the group consisting of monoazo pigments, copper phthalocyanine pigments, quinacridone pigments, anthraquinone pigments, indigo pigments, perylene pigments, perynone pigments and quinophthalone pigments.

9. A baked color pencil lead as described in claim 1, wherein residual pores of the third baked lead which is impregnated with the colorant are impregnated with at least one oil selected from the group consisting of silicone oils, mineral oils, liquid paraffins and α-olefin oligomers.

10. A method of manufacturing a baked color pencil lead, comprising the steps of:

kneading a blend composition comprising at least a filler and an organic forming binder, molding the composition by extrusion, and baking the molded composition in a non-oxidizing atmosphere, thereby to form a first baked lead, heating the first baked lead in an oxidizing atmosphere to remove the binder of the carbon by oxidation, thereby to form a second baked lead, impregnating the pores of the second baked lead with a perhydropolysilazane-containing solution and then subjecting it to a heat treatment in an inert atmosphere or in an ammonia gas atmosphere, thereby to form a third baked lead containing silicon nitride produced by the heat treatment, and impregnating the pores of the third baked lead with an organic pigment solution prepared by dissolving the organic pigment in at least one selected from an organic solvent, an acid solution and an alkali solution and solidifying the organic pigment in the pores by at least one means selected from solvent evaporation, poor solvent replacement and neutralization to allow the pigment to be contained in the baked lead as a colorant.

11. A method for manufacturing a baked color pencil lead as described in claim 10, wherein the filler is at least one selected from the group consisting of titanium oxide, mica, talc, boron nitride, silica, alumina, calcium carbonate, molybdenum disulfide, and tungsten disulfide.

12. A method for manufacturing a baked color pencil lead as described in claim 10, wherein the forming binder is at least one selected from the group consisting of a vinyl chloride resin, a chlorinated vinyl chloride resin, polyvinyl alcohol, a furan resin, a phenol resin, an epoxy resin, lignin, cellulose, tragacanth gum, petroleum asphalt, coal tar pitch, naphtha cracking pitch, and dry distillation pitches of synthetic resins.

13. A baked color pencil lead as described in claim 10, wherein at least one selected from the group consisting of water, dioctyl phthalate, dibutyl phthalate, tricresyl phosphate, dioctyl adipate, propylene carbonate, alcohols, ketones, and esters is blended as a plasticizer or a solvent for the organic forming binder with the blend composition for obtaining the first baked lead.

14. A method for manufacturing a baked color pencil lead as described in claim 10, wherein bentonite or kaolin is blended as a binder with the blend composition for obtaining the first baked lead.

15. A method for manufacturing a baked color pencil lead as described in claim 10, wherein the second lead has a porosity of 30 to 80%.

16. A method for manufacturing a baked color pencil lead as described in claim 10, wherein the inert atmosphere in which the third baked lead is formed is a nitrogen atmosphere.

17. A method for manufacturing a baked color pencil lead as described in claim 10, wherein the colorant is at least one organic pigment selected from the group consisting of monoazo pigments, copper phthalocyanine pigments, quinacridone pigments, anthraquinone pigments, indigo pigments, perylene pigments, perynone pigments and quinophthalone pigments.

18. A method for manufacturing a baked color pencil lead as described in claim 10, wherein residual pores of the third baked lead which is impregnated with the colorant are impregnated with at least one oil selected from the group consisting of silicone oils, mineral oils, liquid paraffins and $\alpha$-olefin oligomers.

* * * * *